(12) United States Patent
Song et al.

(10) Patent No.: US 11,568,394 B1
(45) Date of Patent: Jan. 31, 2023

(54) METHOD FOR ISSUING AND TRANSACTING NON-FUNGIBLE TOKENS BASED ON TIME-CONTEXT DATA TO BE USED FOR SUPPORTING TRANSACTIONS OF HISTORICAL TIME SLOTS, AND SERVER USING THE SAME

(71) Applicant: METABORA CO., LTD., Seongnam-si (KR)

(72) Inventors: Gye Han Song, Seongnam-si (KR); I Goo Lee, Yongin-si (KR); Jae Young Lim, Gwangju-si (KR)

(73) Assignee: METABORA CO., LTD., Gyeonggi-Do (KR)

(*) Notice: Subject to any disclaimer, the term of this patent is extended or adjusted under 35 U.S.C. 154(b) by 0 days.

(21) Appl. No.: 17/823,898

(22) Filed: Aug. 31, 2022

(30) Foreign Application Priority Data

Sep. 8, 2021 (KR) ........................ 10-2021-0119751

(51) Int. Cl.
*G06Q 20/36* (2012.01)
*G06Q 20/38* (2012.01)

(52) U.S. Cl.
CPC ....... *G06Q 20/3678* (2013.01); *G06Q 20/389* (2013.01); *G06Q 2220/00* (2013.01)

(58) Field of Classification Search
CPC ............. G06Q 20/3678; G06Q 20/389; G06Q 2220/00
USPC ......................................................... 705/69
See application file for complete search history.

(56) References Cited

U.S. PATENT DOCUMENTS

| 11,308,487 B1* | 4/2022 | Foster ................ G06Q 20/3829 |
| 2020/0184041 A1* | 6/2020 | Andon ..................... A63F 13/60 |

FOREIGN PATENT DOCUMENTS

| KR | 1020200046260 | 5/2020 |
| KR | 1020210101275 | 8/2021 |

OTHER PUBLICATIONS

Wang et al. ("Non-Fungible Token (NFT): Overview, Evaluation, Opportunities and Challenges", arXiv:2105.07447v3, published on Oct. 25, 2021, 22 pages, written in May 2021) (Year: 2021).*
Singleton ("NFTs: WTF?", www.billboard.com, Mar. 13, 2021, pp. 17-19) (Year: 2021).*

* cited by examiner

*Primary Examiner* — James D Nigh
(74) *Attorney, Agent, or Firm* — Holzer Patel Drennan

(57) ABSTRACT

A method for issuing non-fungible tokens based on time-context data to be used for supporting transactions of historical time slots includes steps of: (a) an NFT platform server, in response to acquiring a specific intention, determining whether at least one specific issuance condition for at least one specific token corresponding to at least one specific historical time slot is satisfied; and (b) the NFT platform server, in response to determining that the specific issuance condition is satisfied, transmitting a specific transaction indicating that an issuance of the specific token is valid to at least part of nodes included in the blockchain network, to thereby update the nodes in the blockchain network and thus enable the issuance of the specific token corresponding to the specific historical time slot.

16 Claims, 6 Drawing Sheets

| | JANUARY 1, 2021 (144 TIME SLOTS) | JANUARY 2, 2021 (144 TIME SLOTS) | JANUARY 3, 2021 (144 TIME SLOTS) | JANUARY 4, 2021 (144 TIME SLOTS) | ... |
|---|---|---|---|---|---|
| 00:00 | | | | | |
| 00:10 | | | ISSUABLE | | |
| 00:20 | | | ISSUABLE | ISSUABLE | |
| 00:30 | ISSUABLE | | ISSUABLE | ISSUABLE | |
| 00:40 | ISSUABLE | | | ISSUABLE | |
| 00:50 | | ISSUABLE | | | |
| 01:00 | | ISSUABLE | | | |
| 01:10 | | ISSUABLE | ISSUABLE | | |
| 01:20 | | | ISSUABLE | ISSUABLE | |
| 01:30 | ISSUABLE | | | ISSUABLE | |
| 01:40 | | ISSUABLE | | | |
| ... | | ISSUABLE | ISSUABLE | | |

FIG. 2

NFT PLATFORM SERVER WHICH IS INTERWORKED WITH A BLOCKCHAIN NETWORK, IN RESPONSE TO ACQUIRING SPECIFIC INTENTION OF SPECIFIC USER TO ISSUE AT LEAST ONE SPECIFIC TOKEN CORRESPONDING TO AT LEAST ONE SPECIFIC HISTORICAL TIME SLOT AMONG HISTORICAL TIME SLOTS, DETERMINING WHETHER AT LEAST ONE SPECIFIC ISSUANCE CONDITION FOR SPECIFIC TOKEN IS SATISFIED, WHEREIN EACH OF THE HISTORICAL TIME SLOTS IS SET FOR EACH OF PREDETERMINED TIME RANGES AND WHEREIN INFORMATION ON HISTORICAL TIME SLOTS IS LISTED TO ALLOW SPECIFIC USER TO ISSUE SPECIFIC TOKEN BASED ON SPECIFIC HISTORICAL EVENT INFORMATION — S01

NFT PLATFORM SERVER, IN RESPONSE TO DETERMINING THAT SPECIFIC ISSUANCE CONDITION IS SATISFIED, TRANSMITTING SPECIFIC TRANSACTION INDICATING THAT ISSUANCE OF SPECIFIC TOKEN IS VALID TO AT LEAST PART OF NODES INCLUDED IN BLOCKCHAIN NETWORK, TO THEREBY UPDATE NODES IN BLOCKCHAIN NETWORK AND THUS ENABLE ISSUANCE OF SPECIFIC TOKEN CORRESPONDING TO SPECIFIC HISTORICAL TIME SLOT — S02

FIG. 3

| | JANUARY 1, 2021 (144 TIME SLOTS) | JANUARY 2, 2021 (144 TIME SLOTS) | JANUARY 3, 2021 (144 TIME SLOTS) | JANUARY 4, 2021 (144 TIME SLOTS) | . . . |
|---|---|---|---|---|---|
| 00:00 | | | | | |
| 00:10 | | | ISSUABLE | | |
| 00:20 | ISSUABLE | | ISSUABLE | ISSUABLE | |
| 00:30 | ISSUABLE | | ISSUABLE | ISSUABLE | |
| 00:40 | | | | ISSUABLE | |
| 00:50 | | ISSUABLE | | | |
| 01:00 | | ISSUABLE | | | |
| 01:10 | | ISSUABLE | ISSUABLE | ISSUABLE | |
| 01:20 | ISSUABLE | | ISSUABLE | ISSUABLE | |
| 01:30 | | ISSUABLE | | | |
| 01:40 | | ISSUABLE | ISSUABLE | | |
| ⋮ | | | | | |

FIG. 4

| UTIME | LTIME | GRP | NFP_TOKEN_ID | NFP_TOKEN_ID_LTIME |
|---|---|---|---|---|
| 1629598791 | 2021-08-22 11:19:51.000000 | 1629598790 | 1926598790 | 2021-08-22 11:19:50.000000 |
| 1629598792 | 2021-08-22 11:19:52.000000 | 1629598790 | 1926598790 | 2021-08-22 11:19:50.000000 |
| 1629598793 | 2021-08-22 11:19:53.000000 | 1629598790 | 1926598790 | 2021-08-22 11:19:50.000000 |
| 1629598794 | 2021-08-22 11:19:54.000000 | 1629598790 | 1926598790 | 2021-08-22 11:19:50.000000 |
| 1629598795 | 2021-08-22 11:19:55.000000 | 1629598790 | 1926598790 | 2021-08-22 11:19:50.000000 |
| 1629598796 | 2021-08-22 11:19:56.000000 | 1629598790 | 1926598790 | 2021-08-22 11:19:50.000000 |
| 1629598797 | 2021-08-22 11:19:57.000000 | 1629598790 | 1926598790 | 2021-08-22 11:19:50.000000 |
| 1629598798 | 2021-08-22 11:19:58.000000 | 1629598790 | 1926598790 | 2021-08-22 11:19:50.000000 |
| 1629598799 | 2021-08-22 11:19:59.000000 | 1629598790 | 1926598790 | 2021-08-22 11:19:50.000000 |
| 1629598800 | 2021-08-22 11:20:00.000000 | 1629598800 | 1629598800 | 2021-08-22 11:20:00.000000 |
| 1629598801 | 2021-08-22 11:20:01.000000 | 1629598800 | 1629598800 | 2021-08-22 11:20:00.000000 |
| 1629598802 | 2021-08-22 11:20:02.000000 | 1629598800 | 1629598800 | 2021-08-22 11:20:00.000000 |
| 1629598803 | 2021-08-22 11:20:03.000000 | 1629598800 | 1629598800 | 2021-08-22 11:20:00.000000 |
| 1629598804 | 2021-08-22 11:20:04.000000 | 1629598800 | 1629598800 | 2021-08-22 11:20:00.000000 |
| 1629598805 | 2021-08-22 11:20:05.000000 | 1629598800 | 1629598800 | 2021-08-22 11:20:00.000000 |
| 1629598806 | 2021-08-22 11:20:06.000000 | 1629598800 | 1629598800 | 2021-08-22 11:20:00.000000 |
| 1629598807 | 2021-08-22 11:20:07.000000 | 1629598800 | 1629598800 | 2021-08-22 11:20:00.000000 |
| 1629598808 | 2021-08-22 11:20:08.000000 | 1629598800 | 1629598800 | 2021-08-22 11:20:00.000000 |
| 1629598809 | 2021-08-22 11:20:09.000000 | 1629598800 | 1629598800 | 2021-08-22 11:20:00.000000 |
| 1629598810 | 2021-08-22 11:20:10.000000 | 1629598810 | 1629598810 | 2021-08-22 11:20:10.000000 |
| 1629598811 | 2021-08-22 11:20:11.000000 | 1629598810 | 1629598810 | 2021-08-22 11:20:10.000000 |
| 1629598812 | 2021-08-22 11:20:12.000000 | 1629598810 | 1629598810 | 2021-08-22 11:20:10.000000 |
| 1629598813 | 2021-08-22 11:20:13.000000 | 1629598810 | 1629598810 | 2021-08-22 11:20:10.000000 |
| 1629598814 | 2021-08-22 11:20:14.000000 | 1629598810 | 1629598810 | 2021-08-22 11:20:10.000000 |
| 1629598815 | 2021-08-22 11:20:15.000000 | 1629598810 | 1629598810 | 2021-08-22 11:20:10.000000 |
| 1629598816 | 2021-08-22 11:20:16.000000 | 1629598810 | 1629598810 | 2021-08-22 11:20:10.000000 |
| 1629598817 | 2021-08-22 11:20:17.000000 | 1629598810 | 1629598810 | 2021-08-22 11:20:10.000000 |
| 1629598818 | 2021-08-22 11:20:18.000000 | 1629598810 | 1629598810 | 2021-08-22 11:20:10.000000 |
| 1629598819 | 2021-08-22 11:20:19.000000 | 1629598810 | 1629598810 | 2021-08-22 11:20:10.000000 |
| 1629598820 | 2021-08-22 11:20:20.000000 | 1629598820 | 1629598820 | 2021-08-22 11:20:20.000000 |
| 1629598821 | 2021-08-22 11:20:21.000000 | 1629598820 | 1629598820 | 2021-08-22 11:20:20.000000 |
| 1629598822 | 2021-08-22 11:20:22.000000 | 1629598820 | 1629598820 | 2021-08-22 11:20:20.000000 |
| 1629598823 | 2021-08-22 11:20:23.000000 | 1629598820 | 1629598820 | 2021-08-22 11:20:20.000000 |
| 1629598824 | 2021-08-22 11:20:24.000000 | 1629598820 | 1629598820 | 2021-08-22 11:20:20.000000 |
| 1629598825 | 2021-08-22 11:20:25.000000 | 1629598820 | 1629598820 | 2021-08-22 11:20:20.000000 |
| 1629598826 | 2021-08-22 11:20:26.000000 | 1629598820 | 1629598820 | 2021-08-22 11:20:20.000000 |
| 1629598827 | 2021-08-22 11:20:27.000000 | 1629598820 | 1629598820 | 2021-08-22 11:20:20.000000 |
| 1629598828 | 2021-08-22 11:20:28.000000 | 1629598820 | 1629598820 | 2021-08-22 11:20:20.000000 |
| 1629598829 | 2021-08-22 11:20:29.000000 | 1629598820 | 1629598820 | 2021-08-22 11:20:20.000000 |
| 1629598830 | 2021-08-22 11:20:30.000000 | 1629598830 | 1629598830 | 2021-08-22 11:20:30.000000 |
| 1629598831 | 2021-08-22 11:20:31.000000 | 1629598830 | 1629598830 | 2021-08-22 11:20:30.000000 |
| 1629598832 | 2021-08-22 11:20:32.000000 | 1629598830 | 1629598830 | 2021-08-22 11:20:30.000000 |
| 1629598833 | 2021-08-22 11:20:33.000000 | 1629598830 | 1629598830 | 2021-08-22 11:20:30.000000 |
| 1629598834 | 2021-08-22 11:20:34.000000 | 1629598830 | 1629598830 | 2021-08-22 11:20:30.000000 |
| 1629598835 | 2021-08-22 11:20:35.000000 | 1629598830 | 1629598830 | 2021-08-22 11:20:30.000000 |
| 1629598836 | 2021-08-22 11:20:36.000000 | 1629598830 | 1629598830 | 2021-08-22 11:20:30.000000 |
| 1629598837 | 2021-08-22 11:20:37.000000 | 1629598830 | 1629598830 | 2021-08-22 11:20:30.000000 |
| 1629598838 | 2021-08-22 11:20:38.000000 | 1629598830 | 1629598830 | 2021-08-22 11:20:30.000000 |
| 1629598839 | 2021-08-22 11:20:39.000000 | 1629598830 | 1629598830 | 2021-08-22 11:20:30.000000 |
| 1629598840 | 2021-08-22 11:20:40.000000 | 1629598840 | 1629598840 | 2021-08-22 11:20:40.000000 |
| 1629598841 | 2021-08-22 11:20:41.000000 | 1629598840 | 1629598840 | 2021-08-22 11:20:40.000000 |
| 1629598842 | 2021-08-22 11:20:42.000000 | 1629598840 | 1629598840 | 2021-08-22 11:20:40.000000 |
| 1629598843 | 2021-08-22 11:20:43.000000 | 1629598840 | 1629598840 | 2021-08-22 11:20:40.000000 |
| 1629598844 | 2021-08-22 11:20:44.000000 | 1629598840 | 1629598840 | 2021-08-22 11:20:40.000000 |
| 1629598845 | 2021-08-22 11:20:45.000000 | 1629598840 | 1629598840 | 2021-08-22 11:20:40.000000 |
| 1629598846 | 2021-08-22 11:20:46.000000 | 1629598840 | 1629598840 | 2021-08-22 11:20:40.000000 |
| 1629598847 | 2021-08-22 11:20:47.000000 | 1629598840 | 1629598840 | 2021-08-22 11:20:40.000000 |
| 1629598848 | 2021-08-22 11:20:48.000000 | 1629598840 | 1629598840 | 2021-08-22 11:20:40.000000 |
| 1629598849 | 2021-08-22 11:20:49.000000 | 1629598840 | 1629598840 | 2021-08-22 11:20:40.000000 |
| 1629598850 | 2021-08-22 11:20:50.000000 | 1629598850 | 1629598850 | 2021-08-22 11:20:50.000000 |
| 1629598851 | 2021-08-22 11:20:51.000000 | 1629598850 | 1629598850 | 2021-08-22 11:20:50.000000 |
| 1629598852 | 2021-08-22 11:20:52.000000 | 1629598850 | 1629598850 | 2021-08-22 11:20:50.000000 |
| 1629598853 | 2021-08-22 11:20:53.000000 | 1629598850 | 1629598850 | 2021-08-22 11:20:50.000000 |

METHOD FOR ISSUING AND TRANSACTING NON-FUNGIBLE TOKENS BASED ON TIME-CONTEXT DATA TO BE USED FOR SUPPORTING TRANSACTIONS OF HISTORICAL TIME SLOTS, AND SERVER USING THE SAME

CROSS REFERENCE TO RELATED APPLICATION

This application claims the benefit of priority to Korean Provisional Patent Application No. 10-2021-0119751, filed on Sep. 8, 2021, the entire contents of which being incorporated herein by reference.

FIELD OF THE DISCLOSURE

The present disclosure relates to a method for issuing and transacting non-fungible tokens based on time-context data to be used for supporting transactions of historical time slots, and a server using the same.

BACKGROUND OF THE DISCLOSURE

An NFT which stands for Non-Fungible Token is similar to cryptocurrency like a bitcoin in that it is also digital information recorded in a blockchain network. However, a characteristic of 'non-fungible', i.e., a characteristic of 'irreplaceable', is the main distinguishing feature between the two. In other words, for general cryptocurrencies such as the bitcoin, any amount is exchangeable given that it is of the same amount, since each individual coin does not have any differentiated feature. In contrast, the NFT, having characteristics of rarity and uniqueness, cannot be exchanged with each other.

By using such characteristics, the NFT is usually used for making transactions easier in fields where scarcity and uniqueness are important considerations such as art. However, usages of the NFT have several disadvantages, such as not being able to protect a copyright of an original author. That is, current NFT algorithms cannot prevent a person who is not the original author from obtaining undue profits by making and selling NFTs without a permission. Also, a purchase of the NFT does not necessarily guarantee an ownership of the purchased work but merely an obtainment of a proof of originality, therefore there are potential legal problems due to such discrepancies.

Therefore, it is preferable to use the NFT for purposes other than trading works of art. But, other than some usages in gaming, there appears to be no prominent usage in other fields.

SUMMARY OF THE DISCLOSURE

It is an object of the present disclosure to solve all the aforementioned problems.

It is another object of the present disclosure to provide a method for issuing non-fungible tokens based on time-context data to be used for supporting transactions of historical time slots.

It is still another object of the present disclosure to provide a method for supporting the non-fungible tokens to be transacted based on the time-context data to be used for supporting the transactions of the historical time slots.

It is still yet another object of the present disclosure to provide a method of allowing a historical time slot corresponding to a same time range to be sold independently for each of service regions.

In order to accomplish objects above, representative structures of the present disclosure are described as follows:

In accordance with one aspect of the present disclosure there is provided a method for issuing non-fungible tokens based on time-context data to be used for supporting transactions of historical time slots, including steps of: (a) an NFT platform server which is interworked with a blockchain network, in response to acquiring a specific intention of a specific user to issue at least one specific token corresponding to at least one specific historical time slot among the historical time slots, determining whether at least one specific issuance condition for the specific token is satisfied, wherein each of the historical time slots is set for each of predetermined time ranges and wherein information on the historical time slots is listed to allow the specific user to issue the specific token based on specific historical event information; and (b) the NFT platform server, in response to determining that the specific issuance condition is satisfied, transmitting a specific transaction indicating that an issuance of the specific token is valid to at least part of nodes included in the blockchain network, to thereby update the nodes in the blockchain network and thus enable the issuance of the specific token corresponding to the specific historical time slot, wherein, at the step of (b), the NFT platform server assigns a specific token ID to timestamps included in a specific time group corresponding to the specific historical time slot by using a specific timestamp function, and transmits the specific transaction including the specific token ID.

As one example, the NFT platform server supports the issuance of the specific token corresponding to the specific historical time slot by providing a smart contract template related to the specific token, and wherein the smart contract template includes at least part of (i) common data including at least one of a token name, a token symbol, and contract metadata connection information and token metadata connection information, and (ii) individual data including at least one of a token ID, token owner information, and token transaction availability information.

As one example, at the step of (a), the NFT platform server allows each of the historical time slots set for each of the predetermined time ranges to be displayed, to thereby allow the specific user to issue the specific token corresponding to the specific historical time slot based on the specific historical event information including at least part of information on at least one previous event that has occurred and information on at least one future event that is expected to occur.

As one example, the method further includes a step of: (c) the NFT platform server performing processes of (i) allowing specific metadata of the specific token to be updated, wherein the specific metadata is stored in a token metadata DB interworked with the NFT platform server, and (ii) allowing a specific historical object corresponding to the specific historical event to be updated, wherein the specific historical object is stored in an object storage interworked with the NFT platform server, by referring to the specific historical event information corresponding to the specific historical time slot acquired from the specific user.

As one example, the method further includes a step of: (d) the NFT platform server, in response to detecting that the specific historical time slot corresponds to a specific point of time, wherein the specific point of time follows a point of time when the specific token is issued, instructing a communication system interworked therewith to provide a commemoration service at the specific point of time by referring to the specific historical event information.

In accordance with another aspect of the present disclosure there is provided a method for issuing non-fungible tokens based on time-context data to be used for supporting transactions of historical time slots, including steps of: (a) an NFT platform server which is interworked with a blockchain network, in response to acquiring a specific intention of a specific user to issue at least one specific token corresponding to at least one specific historical time slot among the historical time slots, determining whether at least one specific issuance condition for the specific token is satisfied, wherein each of the historical time slots is set for each of predetermined time ranges and wherein information on the historical time slots is listed to allow the specific user to issue the specific token based on specific historical event information; and (b) the NFT platform server, in response to determining that the specific issuance condition is satisfied, transmitting a specific transaction indicating that an issuance of the specific token is valid to at least part of nodes included in the blockchain network, to thereby update the nodes in the blockchain network and thus enable the issuance of the specific token corresponding to the specific historical time slot, wherein, at the step of (a), the NFT platform server, in response to acquiring the specific intention of the specific user included in a particular service region among multiple service regions, determines whether a particular issuance condition of a particular token corresponding to the particular service region among the specific tokens set respectively for the service regions for the specific historical time slot is satisfied.

In accordance with still another aspect of the present disclosure there is provided a method for supporting transactions of historical time slots by using non-fungible tokens based on time-context data, including steps of: (a) an NFT platform server which is interworked with a blockchain network, on condition that the NFT platform server has performed (1) a process of acquiring a specific intention of a specific user to issue at least one specific token corresponding to at least one specific historical time slot among the historical time slots and a process of determining whether at least one specific issuance condition for the specific token is satisfied, wherein each of the historical time slots is set for each of predetermined time ranges and wherein information on the historical time slots is listed to allow the specific user to issue the specific token based on specific historical event information, and (2) if the specific issuance condition is satisfied, a process of transmitting a specific transaction indicating that an issuance of the specific token is valid to at least part of nodes included in the blockchain network, to thereby update the nodes in the blockchain network and thus enable the issuance of the specific token corresponding to the specific historical time slot, in response to acquiring a transaction intention of another user to purchase the specific historical time slot, determining whether a specific transaction condition for the specific token corresponding to the specific historical time slot is satisfied; and (b) the NFT platform server, in response to determining that the specific transaction condition is satisfied as a condition to execute a smart contract, transmitting a purchase transaction indicating that a transaction of the specific token is valid to at least part of the nodes included in the blockchain network, to thereby update the nodes in the blockchain network and thus enable the transaction of the specific token corresponding to the specific historical time slot, wherein, at the step of (a), the NFT platform server acquires the transaction intention of said another user to purchase the specific historical time slot and the specific historical event information of the specific user corresponding to the specific historical time, and wherein, at the step of (b), the NFT platform server performs processes of (i) allowing specific metadata of the specific token to be updated, wherein the specific metadata is stored in a token metadata DB interworked with the NFT platform server, and (ii) allowing a specific historical object corresponding to the specific historical event to be updated, wherein the specific historical object is stored in an object storage interworked with the NFT platform server, by referring to the specific historical event information.

As one example, before the step of (a), the method further includes steps of: (a0) the NFT platform server acquiring (i) a sale intention of the specific historical time slot, and (ii) a type of sale for the specific historical time slot, from the specific user of the specific historical time slot; and (a1) The NFT platform server allowing the specific historical time slot to be provided to said another user according to the type of sale.

In accordance with still yet another aspect of the present disclosure there is provided an NFT platform server for issuing non-fungible tokens based on time-context data to be used for supporting transactions of historical time slots, wherein the NFT platform server is interworked with a blockchain network, including: at least one memory that stores instructions; and at least one processor configured to execute the instructions to perform processes of: (I) in response to acquiring a specific intention of a specific user to issue at least one specific token corresponding to at least one specific historical time slot among the historical time slots, determining whether at least one specific issuance condition for the specific token is satisfied, wherein each of the historical time slots is set for each of predetermined time ranges and wherein information on the historical time slots is listed to allow the specific user to issue the specific token based on specific historical event information; and (II) in response to determining that the specific issuance condition is satisfied, transmitting a specific transaction indicating that an issuance of the specific token is valid to at least part of nodes included in the blockchain network, to thereby update the nodes in the blockchain network and thus enable the issuance of the specific token corresponding to the specific historical time slot, wherein, at the process of (II), the processor assigns a specific token ID to timestamps included in a specific time group corresponding to the specific historical time slot by using a specific timestamp function, and transmits the specific transaction including the specific token ID.

As one example, the processor supports the issuance of the specific token corresponding to the specific historical time slot by providing a smart contract template related to the specific token, and wherein the smart contract template includes at least part of (i) common data including at least one of a token name, a token symbol, and contract metadata connection information and token metadata connection information, and (ii) individual data including at least one of a token ID, token owner information, and token transaction availability information.

As one example, at the process of (I), the processor allows each of the historical time slots set for each of the predetermined time ranges to be displayed, to thereby allow the specific user to issue the specific token corresponding to the specific historical time slot based on the specific historical event information including at least part of information on at least one previous event that has occurred and information on at least one future event that is expected to occur.

As one example, the processor further performs a process of: (III) (i) allowing specific metadata of the specific token to be updated, wherein the specific metadata is stored in a token metadata DB interworked with the NFT platform server, and (ii) allowing a specific historical object corresponding to the specific historical event to be updated, wherein the specific historical object is stored in an object storage interworked with the NFT platform server, by referring to the specific historical event information corresponding to the specific historical time slot acquired from the specific user.

As one example, the processor further performs a process of: (IV) in response to detecting that the specific historical time slot corresponds to a specific point of time, wherein the specific point of time follows a point of time when the specific token is issued, instructing a communication system interworked therewith to provide a commemoration service at the specific point of time by referring to the specific historical event information.

In accordance with still yet another aspect of the present disclosure, there is provided an NFT platform server for issuing non-fungible tokens based on time-context data to be used for supporting transactions of historical time slots, wherein the NFT platform server is interworked with a blockchain network, including: at least one memory that stores instructions; and at least one processor configured to execute the instructions to perform processes of: (I) in response to acquiring a specific intention of a specific user to issue at least one specific token corresponding to at least one specific historical time slot among the historical time slots, determining whether at least one specific issuance condition for the specific token is satisfied, wherein each of the historical time slots is set for each of predetermined time ranges and wherein information on the historical time slots is listed to allow the specific user to issue the specific token based on specific historical event information; and (II) in response to determining that the specific issuance condition is satisfied, transmitting a specific transaction indicating that an issuance of the specific token is valid to at least part of nodes included in the blockchain network, to thereby update the nodes in the blockchain network and thus enable the issuance of the specific token corresponding to the specific historical time slot, wherein, at the process of (I), in response to acquiring the specific intention of the specific user included in a particular service region among multiple service regions, the processor determines whether a particular issuance condition of a particular token corresponding to the particular service region among the specific tokens set respectively for the service regions for the specific historical time slot is satisfied.

In accordance with still yet another aspect of the present disclosure, there is provided an NFT platform server for supporting transactions of historical time slots by using non-fungible tokens based on time-context data, wherein the NFT platform server is interworked with a blockchain network, including: at least one memory that stores instructions; and at least one processor configured to execute the instruction to perform processes of: (I) on condition that the NFT platform server has performed (1) a process of acquiring a specific intention of a specific user to issue at least one specific token corresponding to at least one specific historical time slot among the historical time slots and a process of determining whether at least one specific issuance condition for the specific token is satisfied, wherein each of the historical time slots is set for each of predetermined time ranges and wherein information on the historical time slots is listed to allow the specific user to issue the specific token based on specific historical event information, and (2) if the specific issuance condition is satisfied, a process of transmitting a specific transaction indicating that an issuance of the specific token is valid to at least part of nodes included in the blockchain network, to thereby update the nodes in the blockchain network and thus enable the issuance of the specific token corresponding to the specific historical time slot, in response to acquiring a transaction intention of another user to purchase the specific historical time slot, determining whether a specific transaction condition for the specific token corresponding to the specific historical time slot is satisfied; and (II) in response to determining that the specific transaction condition is satisfied as a condition to execute a smart contract, transmitting a purchase transaction indicating that a transaction of the specific token is valid to at least part of the nodes included in the blockchain network, to thereby update the nodes in the blockchain network and thus enable the transaction of the specific token corresponding to the specific historical time slot, wherein, at the process of (I), the processor acquires the transaction intention of said another user to purchase the specific historical time slot and the specific historical event information of the specific user corresponding to the specific historical time, and wherein, at the process of (II), the processor performs processes of (i) allowing specific metadata of the specific token to be updated, wherein the specific metadata is stored in a token metadata DB interworked with the NFT platform server, and (ii) allowing a specific historical object corresponding to the specific historical event to be updated, wherein the specific historical object is stored in an object storage interworked with the NFT platform server, by referring to the specific historical event information.

As one example, before the process of (I), the processor further performs processes of: (I0) acquiring (i) a sale intention of the specific historical time slot, and (ii) a type of sale for the specific historical time slot, from the specific user of the specific historical time slot; and (I1) allowing the specific historical time slot to be provided to said another user according to the type of sale.

BRIEF DESCRIPTION OF THE DRAWINGS

The following drawings to be used for explaining example embodiments of the present disclosure are only part of example embodiments of the present disclosure and other drawings can be acquired based on the drawings by those skilled in the art of the present disclosure without inventive work.

FIG. 2 is a drawing schematically illustrating the method for issuing the NFTs based on the time-context data to be used for supporting the transactions of the historical time slots in accordance with one example embodiment of the present disclosure.

FIG. 3 is a drawing schematically illustrating the historical time slots listed to be selected for issuing the NFTs based on the time-context data in accordance with one example embodiment of the present disclosure.

FIG. 4 is a drawing schematically illustrating tokens with token IDs assigned in the method of issuing the NFTs based on the time-context data in accordance with one example embodiment of the present disclosure.

DETAILED DESCRIPTION OF THE PREFERRED EMBODIMENTS

Figure 1:
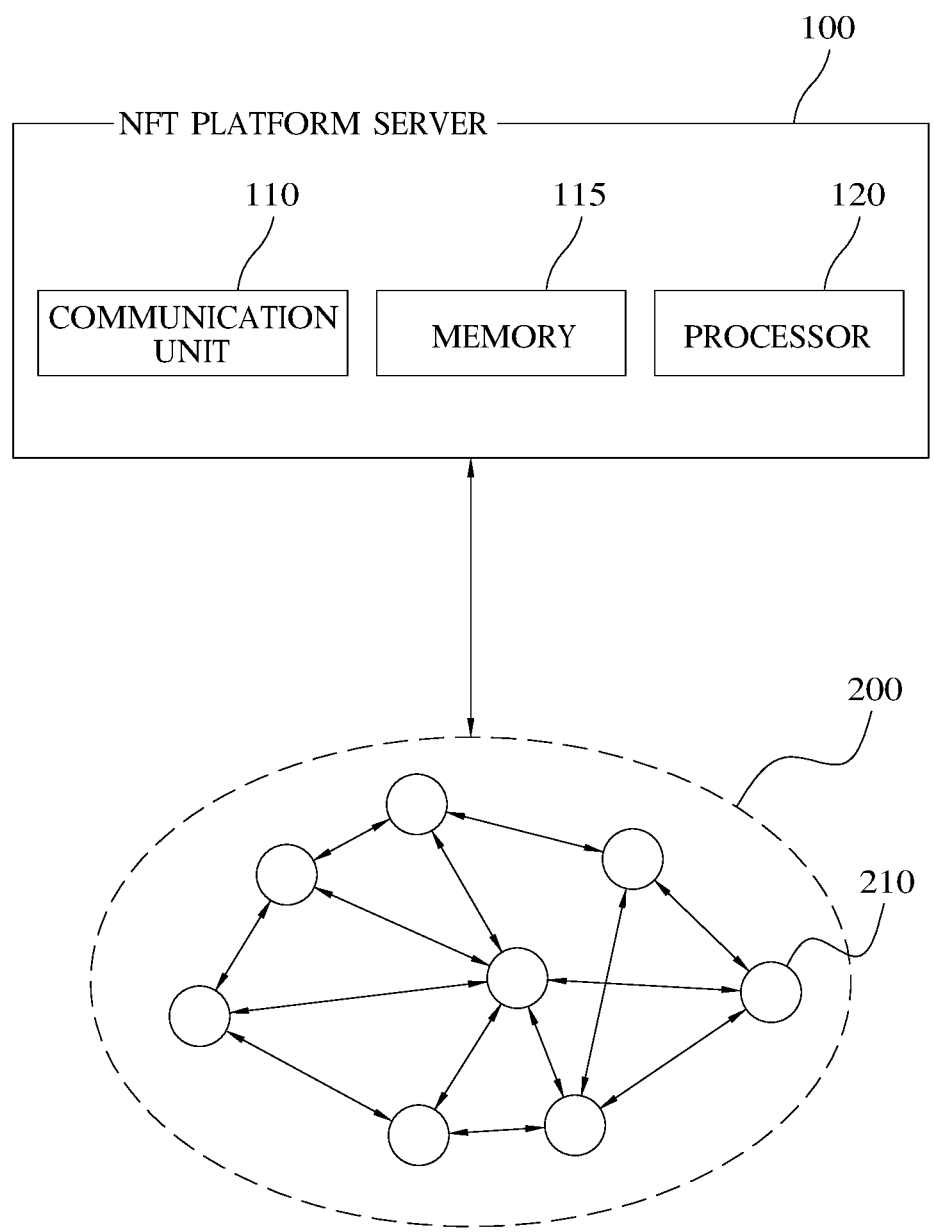
FIG. 1 is a drawing schematically illustrating an NFT platform server for performing a method for issuing and transacting NFTs based on time-context data to be used for supporting transactions of historical time slots in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating an NFT platform server for performing a method of issuing and transacting NFTs based on time-context data to be used for supporting transactions of historical time slots in accordance with one example embodiment of the present disclosure.

Referring to FIG. 1, the NFT platform server 100 may include a communication unit 110 and a processor 120. Herein, input/output and operation processes of the NFT platform server 100 may be performed by the communication unit 110 and the processor 120, respectively. It is noted that explanation on a detailed connection between the communication unit 110 and the processor 120 is omitted in FIG. 1. Also, a memory 115 may store instructions that are to be described hereinafter, and the processor 120 can execute the instructions stored in the memory 115 to perform processes that are to be explained hereinafter to carry out the present invention. The above description of the NFT platform server 100 does not exclude an architecture of including an integrated processor with a medium, a processor, and a memory combined all together to carry out the present invention.

The NFT platform server 100 as described above may be interworked with a blockchain network 200 as shown in FIG. 1. The blockchain network 200 may be distributed networks having one or more nodes including a specific node 210. The NFT platform server 100 may be set up to support a user to access the nodes of the blockchain network 200. Therefore, the NFT platform server 100 may transmit front-end code to the user to thereby perform a role of only supporting the user to access at least one of the nodes or may perform a role of directly connecting the user and at least one of the nodes. However, since these differences in configurations can be appropriately selected by a person skilled in the art according to situations, it should not affect the scope of the present invention.

Further, for the convenience of description, the NFT platform server 100 is described as managing both an issuance and a transaction of the NFTs based on time-context data, but the issuance and the transaction may be performed by different servers.

The configuration of the NFT platform server 100 in accordance with one example embodiment of the present disclosure has been described above. Following, the method of issuing the NFTs based on the time-context data to be used for supporting the transactions of the historical time slots will be described with reference to FIG. 2.

FIG. 2 is a drawing illustrating the method of issuing the NFTs based on the time-context data to be used for supporting the transactions of the historical time slots in accordance with one example embodiment of the present disclosure.

Referring to FIG. 2, the NFT platform server 100, which may be interworked with the blockchain network 200, in response to acquiring a specific intention of a specific user to issue at least one specific token corresponding to at least one specific historical time slot among the historical time slots, may determine whether at least one specific issuance condition for the specific token is satisfied, at a step of S01, wherein each of the historical time slots is set for each of predetermined time ranges and wherein information on the historical time slots is listed to allow the specific user to issue the specific token based on specific historical event information. Next, the NFT platform server 100, in response to determining that the specific issuance condition is satisfied, may transmit a specific transaction indicating that an issuance of the specific token is valid to at least part of nodes included in the blockchain network 200, to thereby update the nodes in the blockchain network 200 and thus enable the issuance of the specific token corresponding to the specific historical time slot, at a step of S02.

In more details, the NFT platform server 100 may allow each of the historical time slots set for each of the predetermined time ranges to be displayed, to thereby allow the specific user to issue the specific token corresponding to the specific historical time slot based on the specific historical event information. Herein, the specific historical event information may include at least part of information on at least one previous event that has occurred and information on at least one future event that is expected to occur. The previous event and the future event may be personally determined by the specific user. Therefore, each of the historical time slots may be set to be corresponding to each of time ranges. That is, the time ranges not only include a specific point of time for the specific token of the specific user but also adjacent points of time, e.g., points of time before and after the specific point of time. For example, if the specific user decides to commemorate its anniversary, then the historical time slots may be displayed such that the time ranges is provided to allow the specific user to select a specific time range corresponding to the anniversary that is in the past of the current point of time. The specific user may also want to commemorate its tenth anniversary, therefore, the historical time slots may be displayed such that the time ranges is provided to allow the specific user to select another time range corresponding to the tenth anniversary that is in the future of the current point of time. An example embodiment of the above is explained by referring to FIG. 3.

FIG. 3 is a drawing schematically illustrating the historical time slots listed to be selected for issuing the NFTs based on the time-context data in accordance with one example embodiment of the present disclosure. Referring to FIG. 3, the historical time slots may be divided into each 10-minute time range. That is, there are 144 historical time slots for each date. The historical time slots can be displayed to allow the specific user to select a specific historical time slot to issue a specific NFT corresponding thereto. FIG. 3 illustrates each of the 10-minute time ranges, but the present disclosure is not limited thereto. For example, each of 1-hour time ranges or each of 2-hour time ranges may be used. As the case may be, the NFT platform server 100 and/or the specific user can adjust a unit of the time ranges or a unit of some part of the time ranges to be selected.

In response to acquiring the specific intention of the specific user to issue the specific token corresponding to the specific historical time slot among the historical time slots, the NFT platform server 100 may determine whether the at least one specific issuance condition for the at least one specific token corresponding to the specific historical time slot is satisfied. Herein the specific issuance condition may include at least one of information on whether the specific token for the specific historical time slot has been issued, information on whether an issuing price for the specific token has been paid, and information on other general issuance conditions that can be implemented by the person skilled in the art.

Next, the NFT platform server 100, in response to determining that the specific issuance condition is satisfied, may transmit the specific transaction indicating that the issuance of the specific token is valid to the at least part of the nodes included in the blockchain network 200. As an example, if the specific node 210 has received the specific transaction, the specific node 210 may record the specific transaction and propagate the fact that the specific transaction has been recorded to the remaining nodes included in the blockchain network 200, to thereby update the nodes in the blockchain network 200. The rest of the processes relating to blockchains can be inferred by the person skilled in art and are therefore omitted.

In order to perform the processes above, the NFT platform server 100 may have already set a smart contract template. Herein, the smart contract template may include at least part of (i) common data including at least one of a token name, a token symbol, and contract metadata connection information and token metadata connection information, and (ii) individual data including at least one of a token ID, token owner information, and token transaction availability information. The token name and the token symbol as the common data may be a specific token name and a specific token symbol corresponding to the specific historical time slot. The contract metadata connection information may include URL information for connecting to a smart contract metadata DB of the blockchain network 200. Further, the token metadata connection information may include URL information for connecting to a token metadata DB which stores metadata of the tokens, i.e., NFTs. Furthermore, the token ID, the token ownership information, and the token transaction availability information as the individual data may be a specific token ID for distinguishing each individual token, specific token owner information of said each individual token, and specific availability of said each individual token, respectively. By having such smart contract template set, the NFT platform server 100 may easily issue the specific token.

Herein, in order to assign the specific token ID, a specific timestamp function may be used. That is, the NFT platform server 100 may assign the specific token to a plurality of timestamps included in a specific time group corresponding to the specific historical time slot by using the specific timestamp function. Reference to FIG. 4 is made to further explain the above example.

FIG. 4 is a drawing schematically illustrating the tokens with token IDs assigned in the method of issuing the NFTs based on the time-context data in accordance with one example embodiment of the present disclosure.

By referring to FIG. 4, if a 10-second time range is used for each of the historical time slots, each of same IDs is assigned to a plurality of time stamps included in each time group. Therefore, by doing so, managing of the tokens can be easier.

After issuing the specific token corresponding to the specific historical time slot by performing the above processes, the NFT platform server 100 may acquire additional information relating to the specific historical time slot from the specific user. That is, the NFT platform server 100 may acquire the specific historical event information corresponding to the specific historical time slot from the specific user. Next, the NFT platform server 100 may perform processes of (i) allowing specific metadata of the specific token to be updated, wherein the specific metadata is stored in the token metadata DB interworked with the NFT platform server 100, and (ii) allowing a specific historical object corresponding to the specific historical event to be updated, wherein the specific historical object is stored in an object storage interworked with the NFT platform server 100, by referring to the specific historical event information. Herein, the specific metadata may include information on what the specific historical time slot means to the specific user or information on notes the specific user wants to record regarding the specific historical time slot. Such information may be too large to be stored on the blockchain, so it may be stored separately in the token metadata DB. Also, the specific historical object may be an object that can be used for commemoration, such as an image and a video.

To further explain the above, an example of the specific user issuing the specific historical time slot corresponding to a birthday of his or her favorite celebrity (herein, the specific historical event is the birthday of the favorite celebrity) will be considered. The specific user may input information that the specific historical time slot corresponds to the favorite celebrity's birthday and information on specific historical data including a photograph of the favorite celebrity to the NFT platform server 100, to thereby allow the NFT platform server 100 to update the token metadata DB and the object storage by using the information on the favorite celebrity's birthday and the photograph of the favorite celebrity. Further details of the update are explained by referring to FIG. 5.

Figure 5:
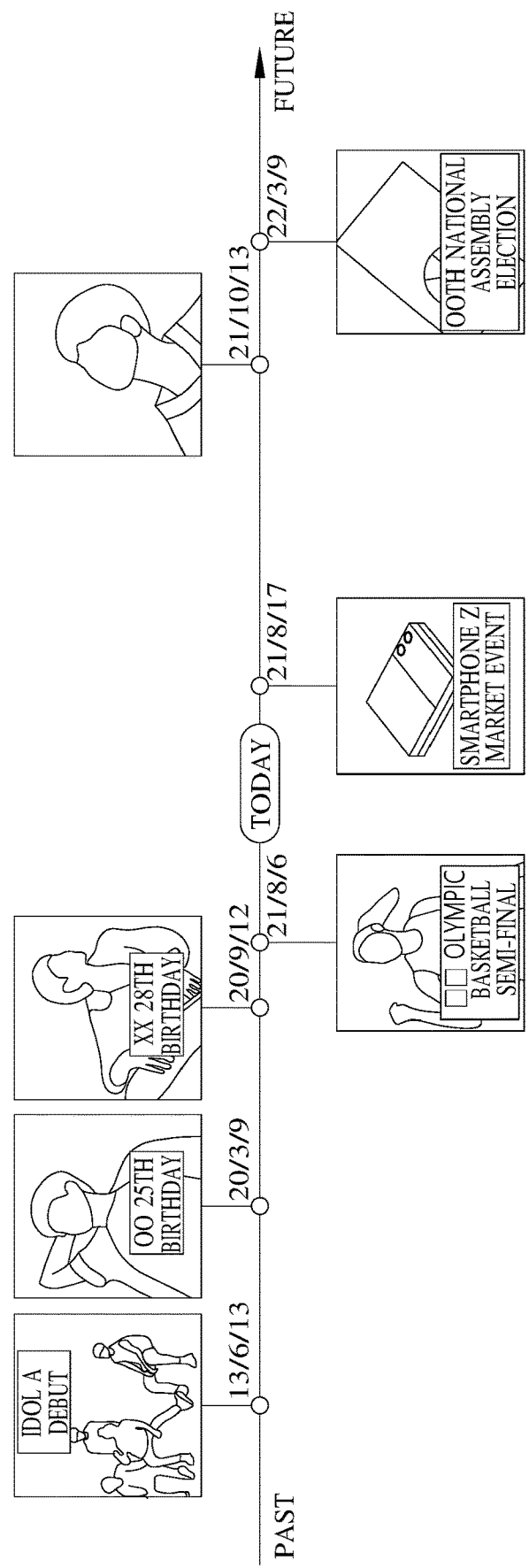
FIG. 5 is a drawing schematically illustrating a plurality of metadata and historical objects updated for each of the historical time slots after issuing the NFTs based on the time-context data to be used for supporting the transactions of the historical time slots in accordance with one example embodiment of the present disclosure.

FIG. 5 is a drawing schematically illustrating a plurality of metadata and historical objects updated for each of the historical time slots after issuing the NFTs based on the time-context data to be used for supporting the transactions of the historical time slots in accordance with one example embodiment of the present disclosure.

By referring to FIG. 5, it is possible to see each of the specific historical time slots for each of dates, each of corresponding specific metadata, and each of the specific historical objects in the form of images. As shown in FIG. 5, the specific historical time slot, in the example, corresponding to the specific historical event relating to the favorite celebrity as described above has been selected to issue the specific token, i.e., the specific NFT. Further, FIG.

5 illustrates a state of issued NFTs related to historical events such as a sport event, a political event, and a market event. By using the method proposed in the present invention, there is an advantage of being able to provide proof of issuance related to the specific NFT corresponding to the specific historical time slot on the blockchain network 200 without excessive costs required to store the specific metadata and the specific historical object on the blockchain network 200. It is appreciated that only parts of the metadata and the historical objects can be stored on the blockchain network 200, however, details thereof are omitted.

Herein, the NFT platform server 100, in response to detecting that the specific historical time slot corresponds to a specific point of time, wherein the specific point of time follows a point of time when the specific token is issued, may instruct a communication system interworked therewith to provide a commemoration service at the specific point of time by referring to the specific historical event information. Herein, the communication system may provide a type of application installed on a predetermined device, an outdoor billboard, or a predetermined area on a website. Referring back to FIG. 5, when an election day of Mar. 9, 2022 comes, the NFT platform server 100 can provide the commemoration service by using the corresponding specific metadata and the corresponding specific historical object inputted by the specific user.

Further, depending on different circumstances, the NFTs for each of multiple service regions may be issued. That is, the same specific historical time slot can be used for a plurality of NFTs for Korea, USA, and Japan. For example, the specific token corresponding to the specific historical time slot of 20:30-20:40 on Jun. 17, 2002 can be issued for Korea, USA, and Japan. Therefore, the NFT platform server 100, in response to acquiring the specific intention of the specific user included in a particular service region among the multiple service regions, may determine whether a particular issuance condition of a particular token corresponding to the particular service region among the specific tokens set respectively for the service regions for the specific historical time slot is satisfied. The subsequent processes involved in issuing the particular token is similar to the method described above. As another example, such particular token corresponding to the specific historical time slot may be issued for different service categories. The service categories may be K-pop idol-related category, political category, economy category, etc.

Next, a method of transacting the NFTs based on the time-context data to be used for supporting the transactions of the historical time slots in accordance with one example embodiment of the present disclosure will be explained by referring to FIG. 6.

Figure 6:
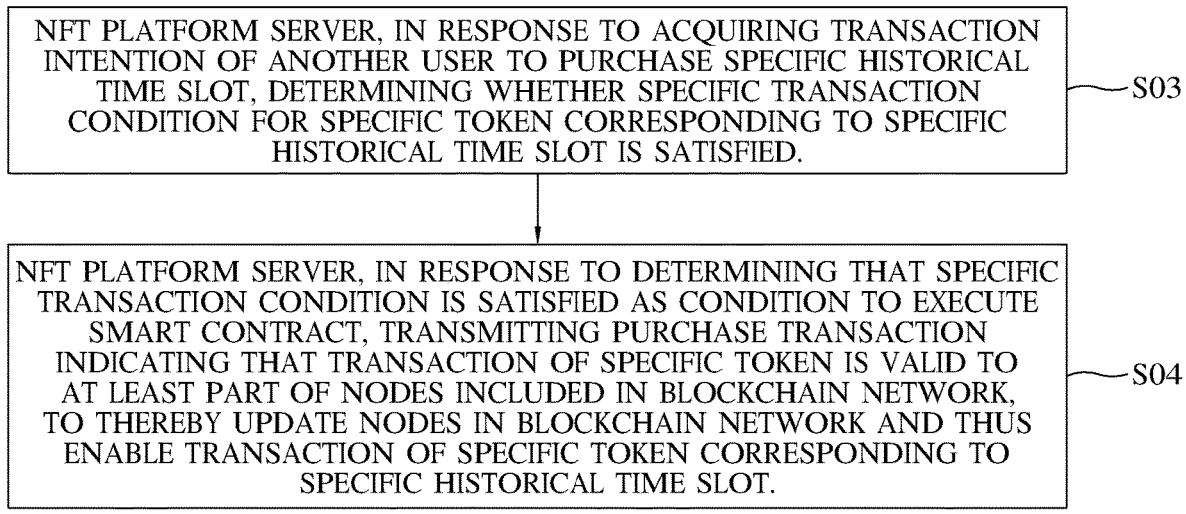
FIG. 6 is a drawing schematically illustrating the method of transacting the historical time slots by using the NFTs based on the time-context data in accordance with one example embodiment of the present disclosure.

FIG. 6 is a drawing schematically illustrating the method of transacting the historical time slots by using the NFTs based on the time-context data in accordance with one example embodiment of the present disclosure.

By referring to FIG. 6, on condition that the NFT platform server has performed (1) a process of acquiring the specific intention of the specific user to issue the at least one specific token corresponding to the at least one specific historical time slot among the historical time slots and the process of determining whether the at least one specific issuance condition for the at least one specific token is satisfied, wherein each of the historical time slots is set for each of the predetermined time ranges and wherein the information on the historical time slots is listed to allow the specific user to issue the specific token based on the specific historical event information, and (2) if the specific issuance condition is satisfied, a process of transmitting a specific transaction indicating that the issuance of the specific token is valid to the at least part of nodes included in the blockchain network 200, to thereby update the nodes in the blockchain network 200 and thus enable the issuance of the specific token corresponding to the specific historical time slot, in response to acquiring a transaction intention of another user to purchase the specific historical time slot, the NFT platform server 100 may determine whether a specific transaction condition for the specific token corresponding to the specific historical time slot is satisfied, at a step of S03. Next, in response to determining that the specific transaction condition is satisfied as a condition to execute a smart contract, the NFT platform server 100 may transmit a purchase transaction indicating that a transaction of the specific token is valid to at least part of the nodes included in the blockchain network 200, to thereby update the nodes in the blockchain network and thus enable the transaction of the specific token corresponding to the specific historical time slot, at a step of S04. That is, after the steps of S01 and S02 of FIG. 2, the steps of S03 and S04 of FIG. 6 can be executed.

The method of transacting, i.e., selling and buying, the specific historical time slot can be similar to the method of issuing the specific historical time slot. That is, when the historical time slots are displayed in a similar manner as illustrated in FIG. 3, if the transaction intention of another user to purchase the specific historical time slot is acquired, the NFT platform server 100 may determine whether a specific transaction condition for the specific token is satisfied. In a similar way to the issuing processes as above, processes such as determining whether the specific token can be purchased and whether a transaction price of the specific token has been remitted can be performed. And general terms and conditions that can be implemented by the person skilled in the art to purchase thereof may also be considered.

Moreover, when the ownership of the specific token is transferred to said another user, the specific metadata and the specific historical object also have to be updated as corresponding to said another user. Therefore, the NFT platform server 100 may acquire the transaction intention of said another user to purchase the specific historical time slot and the specific historical event information of the specific user corresponding to the specific historical time. Next, the NFT platform server 100 may perform processes of (i) allowing the specific metadata of the specific token to be updated, wherein the specific metadata is stored in the token metadata DB interworked with the NFT platform server 100, and (ii) allowing the specific historical object corresponding to the specific historical event to be updated, wherein the specific historical object is stored in the object storage interworked with the NFT platform server 100, by referring to the specific historical event information. Since the processes involved in the method of transacting are similar to those involved in the method of issuing, more detailed description thereof will be omitted.

The present invention has an effect of providing the method for issuing the non-fungible tokens based on the time-context data to be used for supporting the transactions of historical time slots.

The present invention has another effect of providing a method for supporting the non-fungible tokens to be transacted based on the time-context data to be used for supporting the transactions of the historical time slots.

The present invention has still another effect of providing a method of allowing a historical time slot corresponding to a same time range to be sold independently for each of the service regions.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high-level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for issuing non-fungible tokens based on time-context data to be used for supporting transactions of historical time slots, comprising steps of:
   (a) an NFT platform server which is interworked with a blockchain network, in response to acquiring a specific intention of a specific user to issue at least one specific token corresponding to at least one specific historical time slot among the historical time slots, determining whether at least one specific issuance condition for the specific token is satisfied, wherein each of the historical time slots is set for each of predetermined time ranges and wherein information on the historical time slots is listed to allow the specific user to issue the specific token based on specific historical event information; and
   (b) the NFT platform server, in response to determining that the specific issuance condition is satisfied, transmitting a specific transaction indicating that an issuance of the specific token is valid to at least part of nodes included in the blockchain network, to thereby update the nodes in the blockchain network and thus enable the issuance of the specific token corresponding to the specific historical time slot,
   wherein, at the step of (b), the NFT platform server assigns a specific token ID to timestamps included in a specific time group corresponding to the specific historical time slot by using a specific timestamp function, and transmits the specific transaction including the specific token ID.

2. The method of claim 1, wherein the NFT platform server supports the issuance of the specific token corresponding to the specific historical time slot by providing a smart contract template related to the specific token, and wherein the smart contract template includes at least part of (i) common data including at least one of a token name, a token symbol, and contract metadata connection information and token metadata connection information, and (ii) individual data including at least one of a token ID, token owner information, and token transaction availability information.

3. The method of claim 1, wherein, at the step of (a), the NFT platform server allows each of the historical time slots set for each of the predetermined time ranges to be displayed, to thereby allow the specific user to issue the specific token corresponding to the specific historical time slot based on the specific historical event information including at least part of information on at least one previous event that has occurred and information on at least one future event that is expected to occur.

4. The method of claim 1, further comprising a step of:
   (c) the NFT platform server performing processes of (i) allowing specific metadata of the specific token to be updated, wherein the specific metadata is stored in a token metadata DB interworked with the NFT platform server, and (ii) allowing a specific historical object corresponding to the specific historical event to be updated, wherein the specific historical object is stored in an object storage interworked with the NFT platform server, by referring to the specific historical event information corresponding to the specific historical time slot acquired from the specific user.

5. The method of claim 1, further comprising a step of:
   (d) the NFT platform server, in response to detecting that the specific historical time slot corresponds to a specific point of time, wherein the specific point of time follows a point of time when the specific token is issued, instructing a communication system interworked therewith to provide a commemoration service at the specific point of time by referring to the specific historical event information.

6. A method for issuing non-fungible tokens based on time-context data to be used for supporting transactions of historical time slots, comprising steps of:
   (a) an NFT platform server which is interworked with a blockchain network, in response to acquiring a specific intention of a specific user to issue at least one specific token corresponding to at least one specific historical time slot among the historical time slots, determining whether at least one specific issuance condition for the specific token is satisfied, wherein each of the historical time slots is set for each of predetermined time ranges and wherein information on the historical time slots is listed to allow the specific user to issue the specific token based on specific historical event information; and
   (b) the NFT platform server, in response to determining that the specific issuance condition is satisfied, transmitting a specific transaction indicating that an issuance of the specific token is valid to at least part of nodes included in the blockchain network, to thereby update the nodes in the blockchain network and thus enable the issuance of the specific token corresponding to the specific historical time slot, wherein, at the step of (a), the NFT platform server, in response to acquiring the specific intention of the specific user included in a particular service region among multiple service regions, determines whether a particular issuance condition of a particular token corresponding to the particular service region among the specific tokens set respectively for the service regions for the specific historical time slot is satisfied.

7. A method for supporting transactions of historical time slots by using non-fungible tokens based on time-context data, comprising steps of:
(a) an NFT platform server which is interworked with a blockchain network, on condition that the NFT platform server has performed (1) a process of acquiring a specific intention of a specific user to issue at least one specific token corresponding to at least one specific historical time slot among the historical time slots and a process of determining whether at least one specific issuance condition for the specific token is satisfied, wherein each of the historical time slots is set for each of predetermined time ranges and wherein information on the historical time slots is listed to allow the specific user to issue the specific token based on specific historical event information, and (2) if the specific issuance condition is satisfied, a process of transmitting a specific transaction indicating that an issuance of the specific token is valid to at least part of nodes included in the blockchain network, to thereby update the nodes in the blockchain network and thus enable the issuance of the specific token corresponding to the specific historical time slot, in response to acquiring a transaction intention of another user to purchase the specific historical time slot, determining whether a specific transaction condition for the specific token corresponding to the specific historical time slot is satisfied; and
(b) the NFT platform server, in response to determining that the specific transaction condition is satisfied as a condition to execute a smart contract, transmitting a purchase transaction indicating that a transaction of the specific token is valid to at least part of the nodes included in the blockchain network, to thereby update the nodes in the blockchain network and thus enable the transaction of the specific token corresponding to the specific historical time slot,
wherein, at the step of (a), the NFT platform server acquires the transaction intention of said another user to purchase the specific historical time slot and the specific historical event information of the specific user corresponding to the specific historical time, and
wherein, at the step of (b), the NFT platform server performs processes of (i) allowing specific metadata of the specific token to be updated, wherein the specific metadata is stored in a token metadata DB interworked with the NFT platform server, and (ii) allowing a specific historical object corresponding to the specific historical event to be updated, wherein the specific historical object is stored in an object storage interworked with the NFT platform server, by referring to the specific historical event information.

8. The method of claim 7, before the step of (a), further comprising steps of:
(a0) the NFT platform server acquiring (i) a sale intention of the specific historical time slot, and (ii) a type of sale for the specific historical time slot, from the specific user of the specific historical time slot; and (a1) The NFT platform server allowing the specific historical time slot to be provided to said another user according to the type of sale.

9. An NFT platform server for issuing non-fungible tokens based on time-context data to be used for supporting transactions of historical time slots, wherein the NFT platform server is interworked with a blockchain network, comprising:
at least one memory that stores instructions; and
at least one processor configured to execute the instructions to perform processes of: (I) in response to acquiring a specific intention of a specific user to issue at least one specific token corresponding to at least one specific historical time slot among the historical time slots, determining whether at least one specific issuance condition for the specific token is satisfied, wherein each of the historical time slots is set for each of predetermined time ranges and wherein information on the historical time slots is listed to allow the specific user to issue the specific token based on specific historical event information; and (II) in response to determining that the specific issuance condition is satisfied, transmitting a specific transaction indicating that an issuance of the specific token is valid to at least part of nodes included in the blockchain network, to thereby update the nodes in the blockchain network and thus enable the issuance of the specific token corresponding to the specific historical time slot, wherein, at the process of (II), the processor assigns a specific token ID to timestamps included in a specific time group corresponding to the specific historical time slot by using a specific timestamp function, and transmits the specific transaction including the specific token ID.

10. The NFT platform server of claim 9, wherein the processor supports the issuance of the specific token corresponding to the specific historical time slot by providing a smart contract template related to the specific token, and wherein the smart contract template includes at least part of (i) common data including at least one of a token name, a token symbol, and contract metadata connection information and token metadata connection information, and (ii) individual data including at least one of a token ID, token owner information, and token transaction availability information.

11. The NFT platform server of claim 9, wherein, at the process of (I), the processor allows each of the historical time slots set for each of the predetermined time ranges to be displayed, to thereby allow the specific user to issue the specific token corresponding to the specific historical time slot based on the specific historical event information including at least part of information on at least one previous event that has occurred and information on at least one future event that is expected to occur.

12. The NFT platform server of claim 9, wherein the processor further performs a process of:
(III) (i) allowing specific metadata of the specific token to be updated, wherein the specific metadata is stored in a token metadata DB interworked with the NFT platform server, and (ii) allowing a specific historical object corresponding to the specific historical event to be updated, wherein the specific historical object is stored in an object storage interworked with the NFT platform server, by referring to the specific historical event information corresponding to the specific historical time slot acquired from the specific user.

13. The NFT platform server of claim 9, wherein the processor further performs a process of:

(IV) in response to detecting that the specific historical time slot corresponds to a specific point of time, wherein the specific point of time follows a point of time when the specific token is issued, instructing a communication system interworked therewith to provide a commemoration service at the specific point of time by referring to the specific historical event information.

14. An NFT platform server for issuing non-fungible tokens based on time-context data to be used for supporting transactions of historical time slots, wherein the NFT platform server is interworked with a blockchain network, comprising:

at least one memory that stores instructions; and at least one processor configured to execute the instructions to perform processes of: (I) in response to acquiring a specific intention of a specific user to issue at least one specific token corresponding to at least one specific historical time slot among the historical time slots, determining whether at least one specific issuance condition for the specific token is satisfied, wherein each of the historical time slots is set for each of predetermined time ranges and wherein information on the historical time slots is listed to allow the specific user to issue the specific token based on specific historical event information; and (II) in response to determining that the specific issuance condition is satisfied, transmitting a specific transaction indicating that an issuance of the specific token is valid to at least part of nodes included in the blockchain network, to thereby update the nodes in the blockchain network and thus enable the issuance of the specific token corresponding to the specific historical time slot, wherein, at the process of (I), in response to acquiring the specific intention of the specific user included in a particular service region among multiple service regions, the processor determines whether a particular issuance condition of a particular token corresponding to the particular service region among the specific tokens set respectively for the service regions for the specific historical time slot is satisfied.

15. An NFT platform server for supporting transactions of historical time slots by using non-fungible tokens based on time-context data, wherein the NFT platform server is interworked with a blockchain network, comprising:

at least one memory that stores instructions; and at least one processor configured to execute the instruction to perform processes of: (I) on condition that the NFT platform server has performed (1) a process of acquiring a specific intention of a specific user to issue at least one specific token corresponding to at least one specific historical time slot among the historical time slots and a process of determining whether at least one specific issuance condition for the specific token is satisfied, wherein each of the historical time slots is set for each of predetermined time ranges and wherein information on the historical time slots is listed to allow the specific user to issue the specific token based on specific historical event information, and (2) if the specific issuance condition is satisfied, a process of transmitting a specific transaction indicating that an issuance of the specific token is valid to at least part of nodes included in the blockchain network, to thereby update the nodes in the blockchain network and thus enable the issuance of the specific token corresponding to the specific historical time slot, in response to acquiring a transaction intention of another user to purchase the specific historical time slot, determining whether a specific transaction condition for the specific token corresponding to the specific historical time slot is satisfied; and (II) in response to determining that the specific transaction condition is satisfied as a condition to execute a smart contract, transmitting a purchase transaction indicating that a transaction of the specific token is valid to at least part of the nodes included in the blockchain network, to thereby update the nodes in the blockchain network and thus enable the transaction of the specific token corresponding to the specific historical time slot, wherein, at the process of (I), the processor acquires the transaction intention of said another user to purchase the specific historical time slot and the specific historical event information of the specific user corresponding to the specific historical time, and wherein, at the process of (II), the processor performs processes of (i) allowing specific metadata of the specific token to be updated, wherein the specific metadata is stored in a token metadata DB interworked with the NFT platform server, and (ii) allowing a specific historical object corresponding to the specific historical event to be updated, wherein the specific historical object is stored in an object storage interworked with the NFT platform server, by referring to the specific historical event information.

16. The NFT platform server of claim 15, wherein, before the process of (I), the processor further performs processes of:

(I0) acquiring (i) a sale intention of the specific historical time slot, and (ii) a type of sale for the specific historical time slot, from the specific user of the specific historical time slot; and (I1) allowing the specific historical time slot to be provided to said another user according to the type of sale.

* * * * *